US011476763B2

(12) United States Patent
Chang et al.

(10) Patent No.: US 11,476,763 B2
(45) Date of Patent: Oct. 18, 2022

(54) TRANS-INDUCTOR VOLTAGE REGULATOR WITH NONLINEAR TRANSFORMER

(71) Applicant: Monolithic Power Systems, Inc., San Jose, CA (US)

(72) Inventors: Chiahsin Chang, Cupertina, CA (US); Hang Shao, San Jose, CA (US); Qian Li, San Jose, CA (US); Tao Zhao, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 17/352,519

(22) Filed: Jun. 21, 2021

(65) Prior Publication Data

US 2022/0216788 A1    Jul. 7, 2022

Related U.S. Application Data

(63) Continuation-in-part of application No. 17/141,528, filed on Jan. 5, 2021.

(51) Int. Cl.
*H02M 3/158* (2006.01)
*H02M 3/335* (2006.01)

(52) U.S. Cl.
CPC ....... *H02M 3/158* (2013.01); *H02M 3/33576* (2013.01)

(58) Field of Classification Search
CPC ...... H02M 1/0064; H02M 1/084; H02M 1/14; H02M 1/15; H02M 1/0067; H02M 1/007; H02M 1/0074; H02M 3/158; H02M 3/1584

See application file for complete search history.

(56) References Cited

U.S. PATENT DOCUMENTS

| 6,034,855 | A | * | 3/2000 | Bishop | .................. H02H 9/021 333/17.1 |
|---|---|---|---|---|---|
| 7,791,321 | B2 | | 9/2010 | Ming | |
| 9,041,373 | B2 | | 5/2015 | Lijie | |
| 9,270,178 | B2 | | 2/2016 | Lijie | |
| 9,496,792 | B2 | | 11/2016 | Qian | |
| 9,559,586 | B2 | | 1/2017 | Qian | |

(Continued)

OTHER PUBLICATIONS

Zhang, et al. Analysis of Multi-Phase Trans-Inductor Voltage Regulator with Fast Transient Response for Large Load Current Applications, Apr. 27, 2021, IEEE, 2021 IEEE International Symposium on Circuits and Systems (ISCAS), (Year: 2021).*

(Continued)

*Primary Examiner* — Alex Torres-Rivera
(74) *Attorney, Agent, or Firm* — Perkins Coie LLP

(57) ABSTRACT

A trans-inductor voltage regulator (TLVR) circuit has multiple phases and a regulator block for each phase. Each regulator block is connected to an output capacitor of the TLVR circuit by way of a first winding of a corresponding nonlinear transformer. A second winding of the nonlinear transformers are connected in series with a compensation inductor. The first winding of the corresponding nonlinear transformer has a first inductance when a load current is at a first level, and the first winding of the corresponding nonlinear transformer has a second inductance that is less than the first inductance when the load current is at a second level that is higher than the first level.

20 Claims, 12 Drawing Sheets

(56) References Cited

U.S. PATENT DOCUMENTS

| | | | |
|---|---|---|---|
| 10,348,197 B2 | 7/2019 | Chao | |
| 10,498,241 B2 | 12/2019 | Xiaokang | |
| 10,516,337 B2 * | 12/2019 | Ojika | ................. H02M 3/1588 |
| 11,303,204 B1 * | 4/2022 | Zhao | ...................... H02M 3/04 |
| 2003/0169142 A1 * | 9/2003 | Vicci | ......................... H01F 7/20 |
| | | | 336/178 |
| 2017/0248996 A1 * | 8/2017 | Zhang | ...................... G06F 1/26 |
| 2020/0169170 A1 | 5/2020 | Tianzhu | |
| 2022/0109368 A1 * | 4/2022 | Zhou | .................. H02M 1/0032 |

OTHER PUBLICATIONS

Shao et al., Analytic Model and Design Procedure of the Single-Secondary Trans-Inductor Voltage Regulator, Nov. 16, 2021, IEEE, 2021 IEEE Energy Conversion Congress and Exposition (ECCE), pp. 2005-2010 (Year: 2021).*

* cited by examiner

TRANS-INDUCTOR VOLTAGE REGULATOR WITH NONLINEAR TRANSFORMER

CROSS-REFERENCE TO RELATED APPLICATIONS

This application claims the benefit of U.S. application Ser. No. 17/141,528, filed on Jan. 5, 2021, and incorporated herein by reference.

TECHNICAL FIELD

The present invention generally refers to electrical circuits, and more particularly but not exclusively refers to trans-inductor voltage regulators.

BACKGROUND

In power conversion applications, an interleaved multiphase power supply is widely used in large power and large current condition since the interleaved multi-phase power supply may be able to provide a large output current with small current ripples, optimized thermal and power distributions.

A trans-inductor voltage regulator (TLVR) is a type of multi-phase voltage regulator that uses a winding of a transformer as an output inductor. In a multiphase TLVR circuit, a winding of a transformer is employed as an output inductor of a phase, and the other windings of the transformers of all the phases are connected in a series loop to ground. Because of the series connection of the other windings, all of the phases are able to respond to a change in load current, allowing for a faster transient response compared to conventional voltage regulators.

SUMMARY

Embodiments of the present invention are directed to a trans-inductor voltage regulator (TLVR) circuit, comprising: a plurality of nonlinear transformers, each of the plurality of nonlinear transformers comprising a first winding and a second winding, the second windings of the plurality of nonlinear transformers being connected in series to each other; a plurality of regulator blocks that each provides a phase of the TLVR circuit, each of the plurality of regulator blocks being connected to an output capacitor of the TLVR circuit by way of the first winding of a corresponding one of the plurality of nonlinear transformers, the first winding of the corresponding one of the plurality of nonlinear transformers having a first inductance when a load current provided by the TLVR circuit to a load is at a first level, and the first winding of the corresponding one of the plurality of nonlinear transformers having a second inductance that is less than the first inductance when the load current is at a second level that is higher than the first level; and a compensation inductor that is connected in series with the second windings of the plurality of nonlinear transformers.

Embodiments of the present invention are further directed to a trans-inductor voltage regulator (TLVR) circuit, comprising: a first regulator block of a first phase of the TLVR circuit, the first regulator block comprising a high-side switch that is connected to an input voltage, a low-side switch that forms a switch node with the high-side switch of the first regulator block, wherein the switch node of the first regulator block is connected to an output voltage of the TLVR circuit by way of a first winding of a first nonlinear transformer, the first winding of the first nonlinear transformer having a first inductance when a load current provided by the TLVR circuit to a load is at a first level, and the first winding of the first nonlinear transformer having a second inductance that is less than the first inductance when the load current is at a second level that is higher than the first level; a second regulator block of a second phase of the TLVR circuit, the second regulator block comprising a high-side switch that is connected to the input voltage, a low-side switch that forms a switch node with the high-side switch of the second regulator block, wherein the switch node of the second regulator block is connected to the output voltage of the TLVR circuit by way of a first winding of a second nonlinear transformer, the first winding of the second nonlinear transformer having a third inductance when the load current is at the first level, and the first winding of the second nonlinear transformer having a fourth inductance that is less than the third inductance when the load current is at the second level; and a compensation inductor that is connected in series with a second winding of the first nonlinear transformer and a second winding of the second nonlinear transformer.

Embodiments of the present invention are further directed to a trans-inductor voltage regulator (TLVR) circuit, comprising: a first regulator block of a first phase of the TLVR circuit, the first regulator block comprising a high-side switch that is connected to an input voltage, a low-side switch that forms a switch node with the high-side switch of the first regulator block, wherein the switch node of the first regulator block is connected to an output voltage of the TLVR circuit by way of a first primary winding of a nonlinear transformer, the first primary winding having a first inductance when a load current provided by the TLVR circuit to a load is at a first level, and the first primary winding having a second inductance that is less than the first inductance when the load current is at a second level that is higher than the first level; a second regulator block of a second phase of the TLVR circuit, the second regulator block comprising a high-side switch that is connected to the input voltage, a low-side switch that forms a switch node with the high-side switch of the second regulator block, wherein the switch node of the second regulator block is connected to the output voltage of the TLVR circuit by way of a second primary winding of the nonlinear transformer, the second primary winding having a third inductance when the load current is at the first level, and the second primary winding having a fourth inductance that is less than the third inductance when the load current is at the second level; and a compensation inductor that is connected in series with a secondary winding of the nonlinear transformer.

These and other features of the present invention will be readily apparent to persons of ordinary skill in the art upon reading the entirety of this disclosure, which includes the accompanying drawings and claims.

The use of the same reference label in different drawings indicates the same or like components, and the figures are not drawn for scale.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
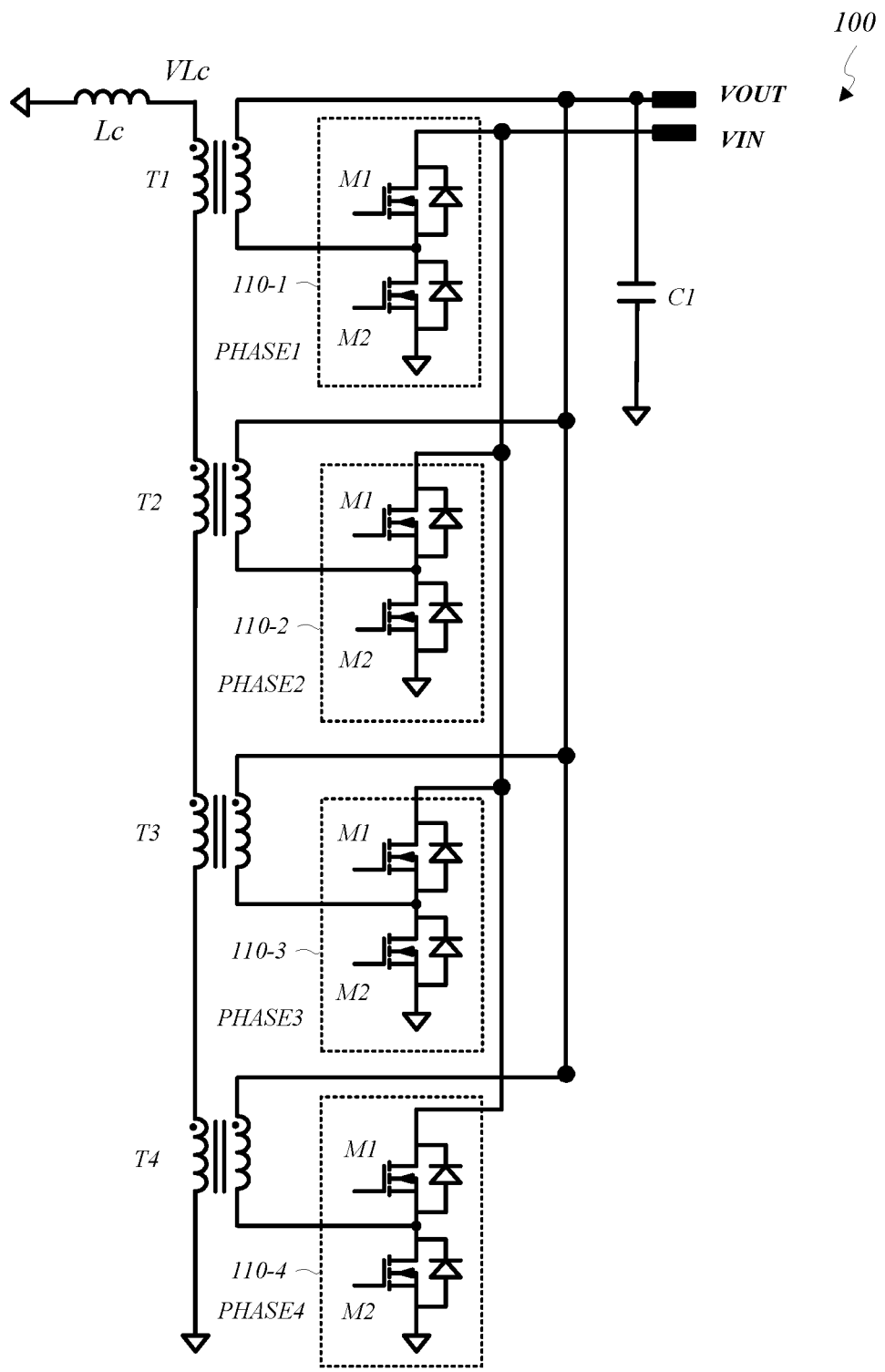
FIG. 1 shows a schematic diagram of a trans-inductor voltage regulator (TLVR) circuit 100 in accordance with an embodiment of the present invention.

FIG. 1 shows a schematic diagram of a TLVR circuit 100 in accordance with an embodiment of the present invention. In the example of FIG. 1, the TLVR circuit 100 is a multiphase TLVR with four phases. As can be appreciated, the TLVR circuit 100 may also be implemented with fewer or more phases.

In the example of FIG. 1, the TLVR circuit 100 comprises a plurality of regulator blocks 110 (i.e., 110-1, 110-2 . . . ), one for each phase. The regulator blocks 110-1, 110-2, 110-3, and 110-4 are for phase 1, phase 2, phase 3, and phase 4, respectively. A regulator block 110 may be a buck regulator comprising a high-side switch M1 and a low-side switch M2. The high-side switch M1 is connected to an input voltage VIN. The switches M1 and M2 are driven by a corresponding pulse width modulation (PWM) signal. The PWM signals of all the phases are interleaved to charge an output capacitor C1 to develop an output voltage VOUT.

In the example of FIG. 1, a regulator block 110 has a corresponding transformer whose primary winding serves as an output inductor of the regulator block 110. For example, referring to the regulator block 110-1, the transformer T1 has a primary winding with a first end that is connected to a switch node of the switches M1 and M2 and a second end that is connected to the output voltage VOUT. The secondary winding of the transformer T1 is connected in series with the secondary windings of the transformers T2, T3, and T4 of the regulator blocks 110-2, 110-3, and 110-4, respectively. A compensation inductor Lc is connected in series with the secondary windings of the transformers T1, T2, T3, and T4. The compensation inductor loop (i.e., the series-connected compensation inductor Lc and the secondary windings of transformers T1, T2, T3, and T4) is grounded. Each transformer may have a primary to secondary turns ratio of 1:1, for example.

In one embodiment, the compensation inductor Lc is nonlinear in that it does not have a constant inductance throughout its operating region in the TLVR circuit 100; the inductance of the compensation inductor Lc varies depending on load condition. More particularly, the compensation inductor Lc is configured to have an inductance that is large when the compensation inductor current (i.e., current through the compensation inductor Lc) is low and an inductance that is small when the compensation inductor current is high. The compensation inductor current is typically low during load steady state conditions (i.e., when the current drawn by the load is non-varying at a stable level) and high during load transient conditions. A load transient condition occurs when there is a sudden increase in current demanded by the load. By increasing the inductance of the compensation inductor Lc when the compensation inductor current is low, the ripple on the output voltage VOUT is reduced when the load current is at steady state. By reducing the inductance of the compensation inductor Lc when the compensation inductor current is high, the TLVR circuit 100 is able to respond faster to load transient conditions.

In the example of FIG. 1, the TLVR circuit 100 is depicted as having a single primary winding and a single secondary winding for illustration purposes. As can be appreciated, embodiments of the present invention are also applicable to TLVR circuits with different numbers of transformer windings.

Figure 2:
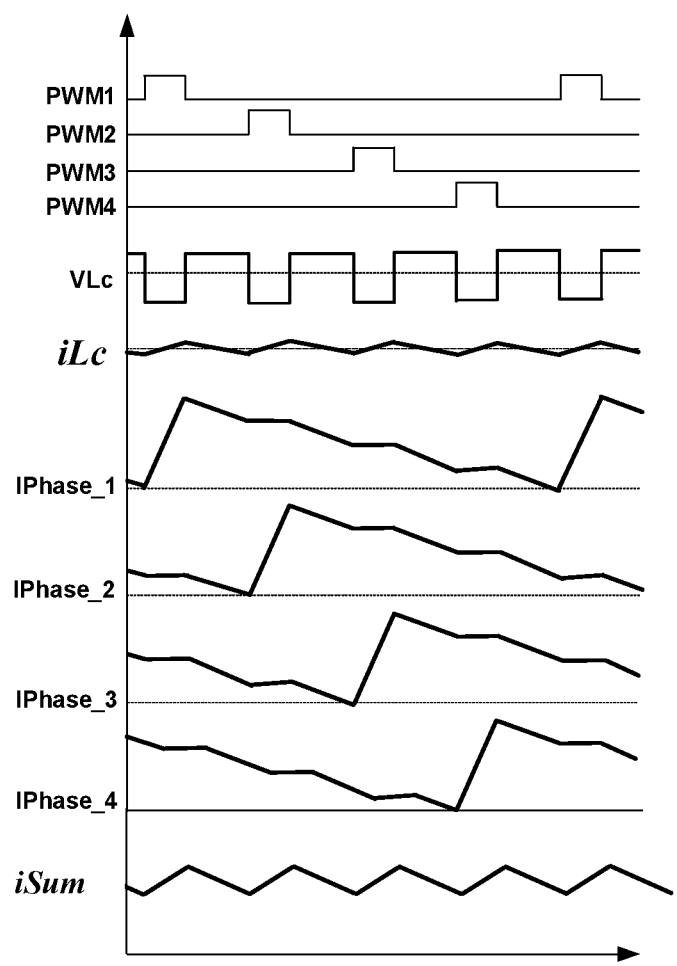
FIG. 2 shows a timing diagram of signals of the TLVR circuit 100 of FIG. 1 during load steady state conditions in accordance with an embodiment of the present invention.

FIG. 2 shows a timing diagram of signals of the TLVR circuit 100 during load steady state condition in accordance with an embodiment of the present invention. FIG. 2 shows, from top to bottom, the signal PWM1 (i.e., PWM signal driving the regulator block 110-1), signal PWM2 (i.e., PWM signal driving the regulator block 110-2), signal PWM3 (i.e., PWM signal driving the regulator block 110-3), signal PWM4 (i.e., PWM signal driving the regulator block 110-4), compensation inductor voltage VLc, compensation inductor current iLc, current iPhase1 (i.e., output current of the regulator block 110-1), current iPhase2 (i.e., output current of the regulator block 110-2), current iPhase3 (i.e., output current of the regulator block 110-3), current iPhase4 (i.e., output current of the regulator block 110-4), and a current iSum. The current iSum is the sum of currents iPhase1, iPhase2, iPhase3, and iPhase4. In general, the high-frequency current ripple on each of the phases adds up and is reflected on the output voltage VOUT because all of the phases are in series.

Figure 3:
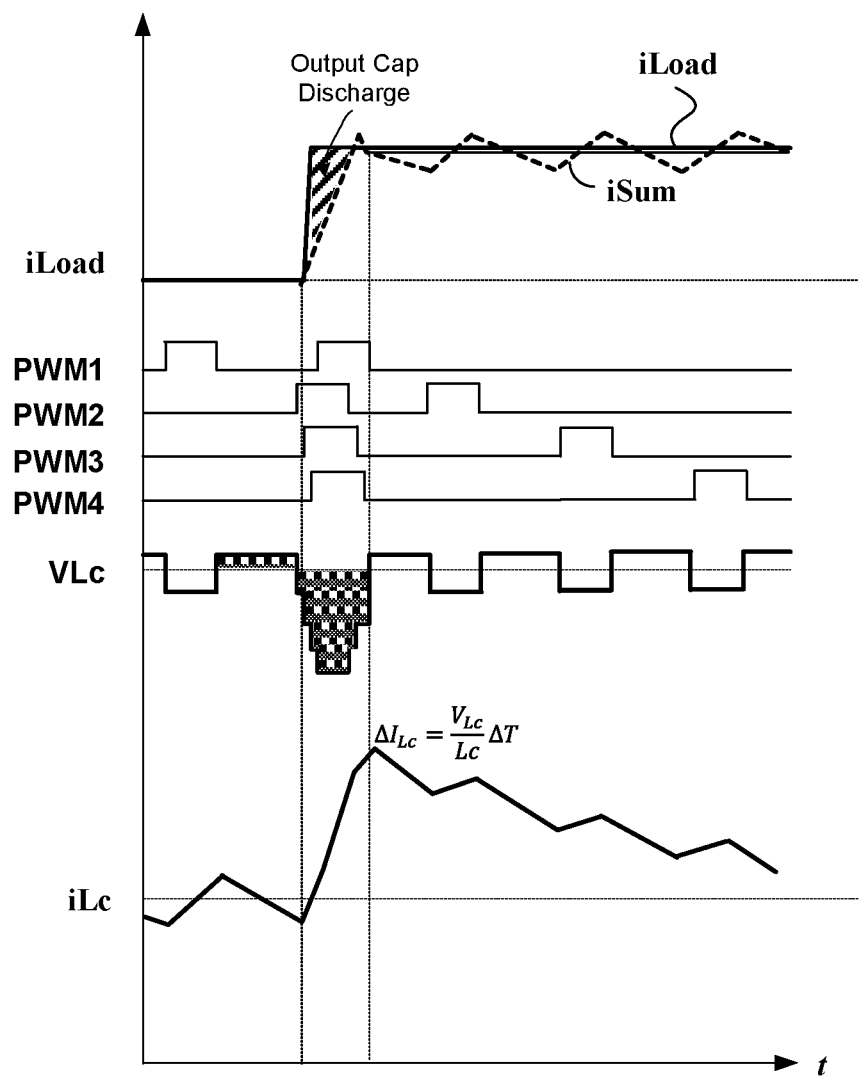
FIG. 3 shows a timing diagram of signals of a typical TLVR circuit during load transient conditions when the compensation inductor has a constant inductance throughout its operating region.

FIG. 3 shows a timing diagram of signals of a typical TLVR circuit during load transient conditions. In the example of FIG. 3, the TLVR circuit is the same as the TLVR circuit 100 except with a compensation inductor that has a constant inductance throughout its operating region. FIG. 3 shows, from top to bottom, a current iSum superimposed on a load current iLoad (i.e., current drawn by a load from the TLVR circuit), a signal PWM1 driving a first phase regulator block, a signal PWM2 driving a second phase regulator block, a signal PWM3 driving a third phase regulator block, a signal PWM4 driving a fourth phase regulator block, a compensation inductor voltage VLc, and a compensation inductor current iLc.

A load transient condition occurs when the load current iLoad increases at a high rate. To maintain the output voltage VOUT at the regulated level, a TLVR circuit responds by increasing the duty cycle of the PWM signals driving the regulator blocks. The increased duty cycle is reflected in the secondary windings of the transformers, thereby causing the compensation inductor current iLc to increase. With a compensation inductor that has a constant inductance Lc throughout its operating region, choosing a small inductance Lc will result in faster slew rate of the current iSum during transient conditions, thus providing faster transient response at the cost of increasing the steady-state ripple of the current iSum and the output voltage. On the other hand, choosing a large inductance Lc will result in smaller output voltage ripple but with slower transient response.

Figure 4:
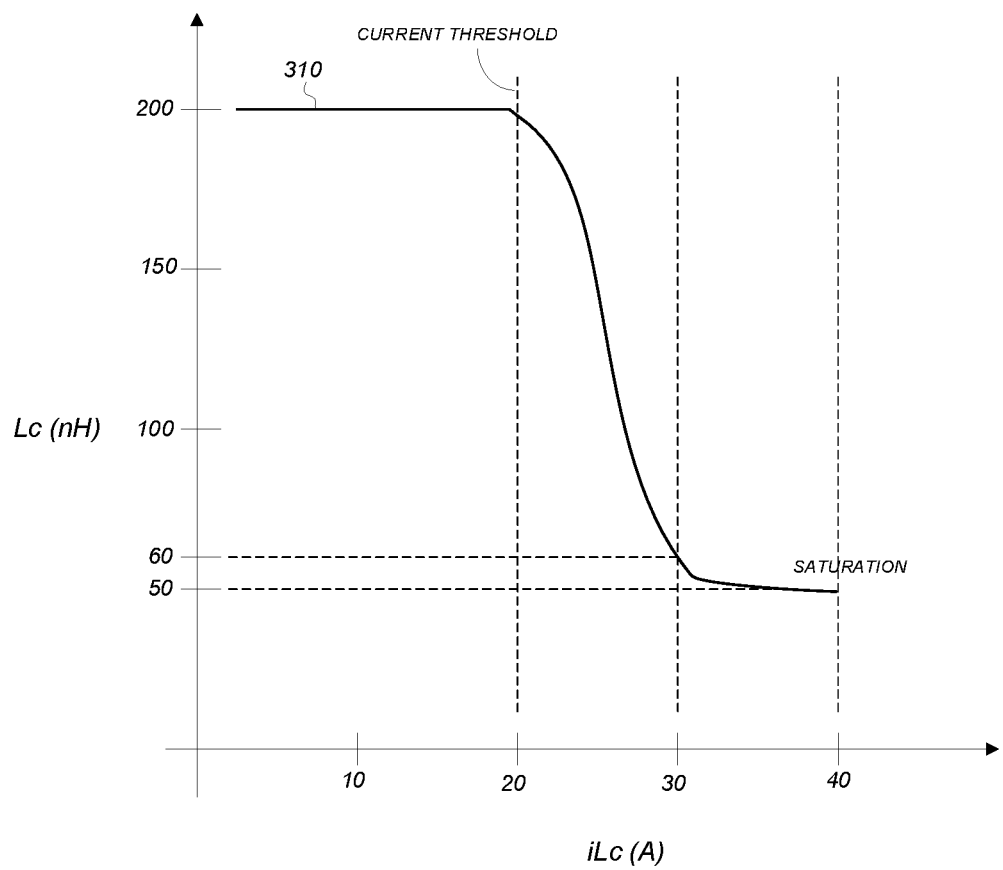
FIGS. 4-7 show inductance profiles of nonlinear compensation inductors in accordance with embodiments of the present invention.

FIG. 4 shows an inductance profile 310 of the compensation inductor Lc in accordance with an embodiment of the present invention. In the example of FIG. 4, the vertical axis indicates inductance Lc of the compensation inductor Lc in nano Henry (nH) and the horizontal axis indicates the compensation inductor current iLc in Amp (A). The inductance Lc may be configured to be a large inductance up to a current threshold and to decrease sharply after the current threshold. In the example of FIG. 4, the inductance Lc is at least 200 nH from zero to a current threshold of about 20 A. Past the current threshold, the inductance Lc sharply decreases to about 50-60 nH at 30 A up to saturation current.

Figure 5:
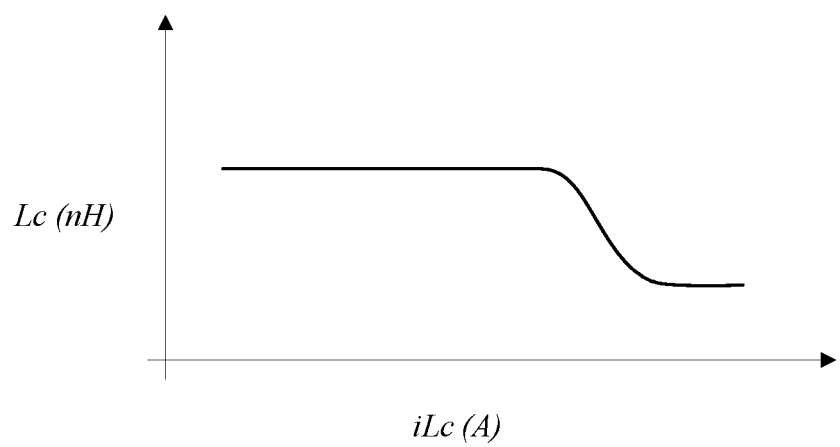
Figure 6:
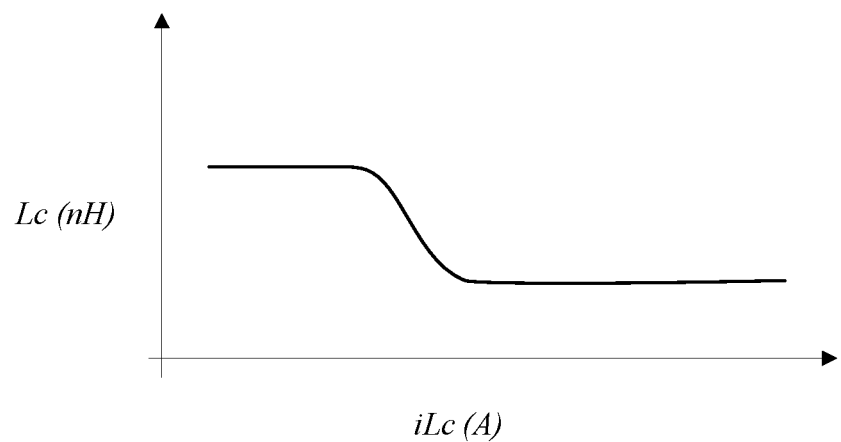

The inductance profile 310 is provided for illustration purposes only. In light of the present disclosure, it can be appreciated that the inductance profile of a compensation inductor may be configured to meet the needs of a particular TLVR circuit. For example, the inductance Lc may be configured to decrease sharply at a lower compensation inductor current iLc as illustrated in FIG. 5 (e.g., at a current threshold of 10 A) or at higher compensation inductor current iLc (e.g., at a current threshold of 30 A) as illustrated in FIG. 6.

Figure 7:
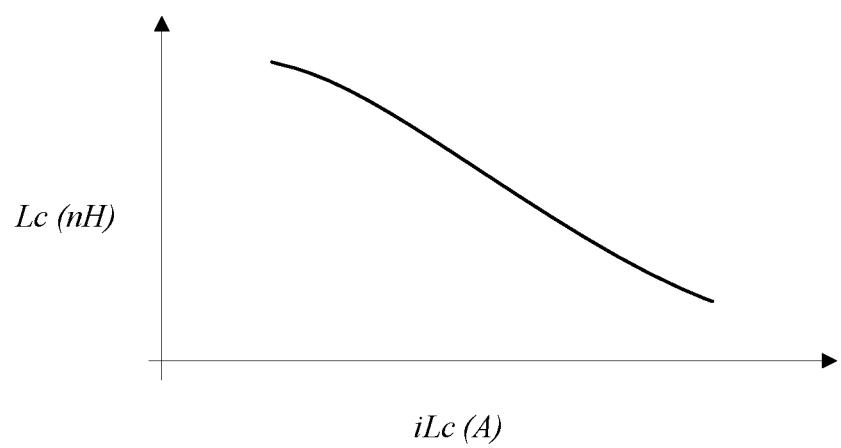

In some embodiments, the compensation inductor Lc has a linear inductance profile as illustrated in FIG. 7. In the example of FIG. 7, "linear" refers to the shape of the inductance profile. As can be appreciated, a nonlinear compensation inductor in a TLVR circuit may have a linear inductance profile by having varying inductance depending on load condition.

In general, the inductance Lc and the compensation inductor current iLc have a negative correlation, so that the inductance Lc is large when the compensation inductor current iLc is responsive to a steady state load current (i.e., low inductor current iLc) and the inductance Lc is small when the compensation inductor current iLc is responsive to a transient load current (i.e., high inductor current iLc). For example, the inductance Lc at steady state load current may be at least three times larger than the inductance Lc at transient load current. In some embodiments, the inductance Lc at steady state load current may be two times or 1.5 times larger than the inductance Lc at transient load current.

The inductance profile of the compensation inductor Lc may be configured by using a suitable magnetic core. For example, instead of using a magnetic core made of ferrites, a magnetic core made of powdered-iron, hybrid material, multiple magnetic core parts of different materials, etc., may be employed to shape the inductance profile of the compensation inductor Lc. Generally speaking, an inductor vendor can shape the inductance profile of a compensation inductor in accordance with the present disclosure using various techniques without detracting from the merits of the present invention.

Figure 8:
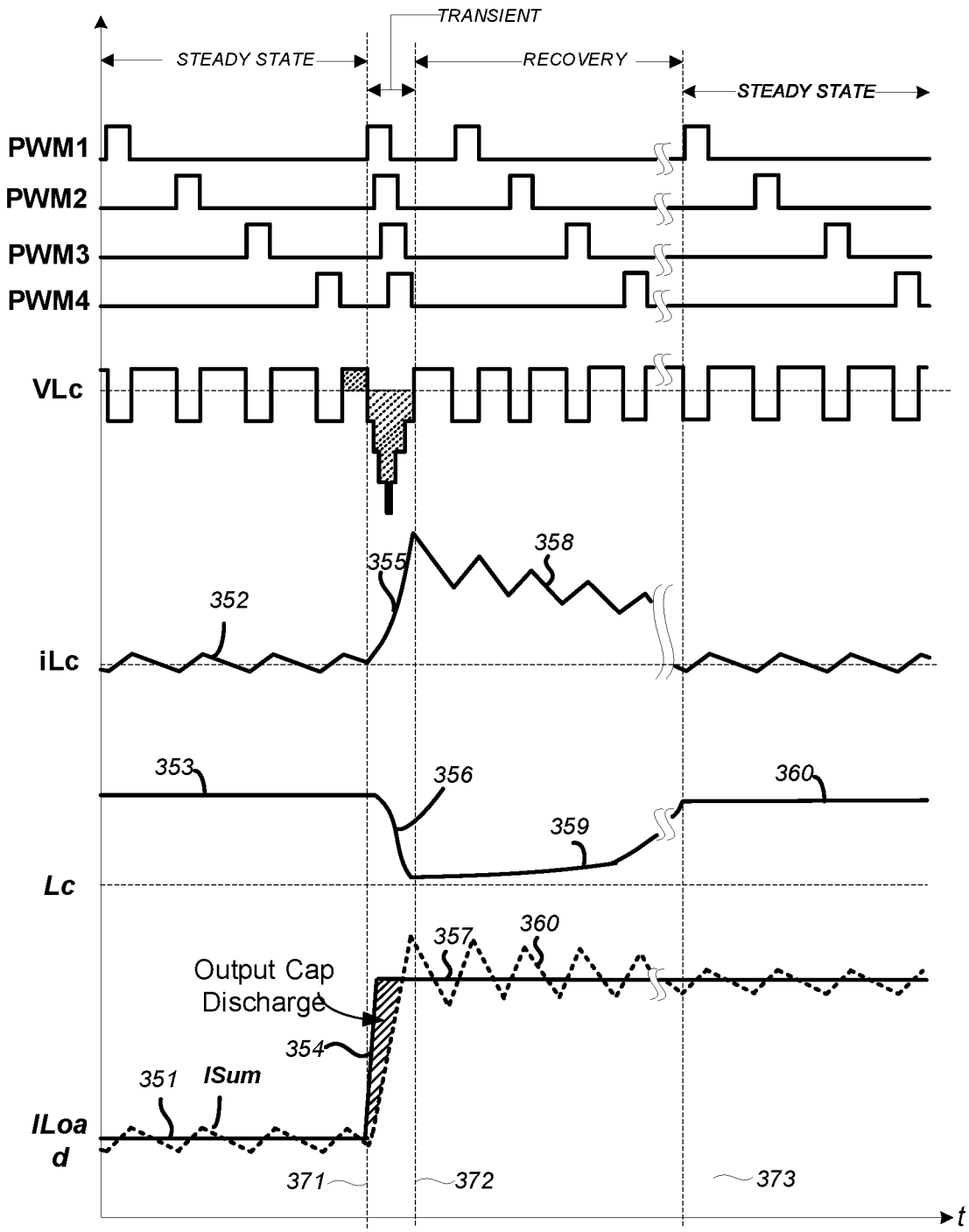
FIG. 8 shows a timing diagram of signals of the TLVR circuit 100 of FIG. 1 in accordance with an embodiment of the present invention.

FIG. 8 shows a timing diagram of signals of the TLVR circuit 100 in accordance with an embodiment of the present invention. FIG. 8 shows, from top to bottom, the signal PWM1, the signal PWM2, the signal PWM3, the signal PWM4, the compensation inductor voltage VLc, the compensation inductor current iLc, the inductance Lc of the compensation inductor Lc, and the current iSum superimposed on the load current iLoad.

Prior to a time point 371, the load current iLoad is at steady state (see 351). Accordingly, the responsive compensation inductor current iLc is small (see 352), which causes the inductance Lc to be large (see 353), thereby minimizing the compensation inductor current iLc and the current iSum ripple. At the time point 371, a load transient condition occurs when the load current iLoad increases at a high rate (see 354). In response, the compensation inductor current iLc increases (see 355). The inductance Lc decreases sharply (see 356) when the compensation inductor current iLc increases to a current threshold. The decreased inductance Lc allows the TLVR circuit 100 to rapidly respond to the load transient condition. At a time point 372, the load current iLoad and the current iSum start to recover towards steady state (see 357), which causes the compensation inductor current iLc to decrease (see 358). The inductance Lc increases (see 359) when the compensation inductor current iLc decreases below the current threshold. The inductance Lc eventually increases to a large value (see 360) at load steady state (see time point 373), thereby minimizing ripple on the output voltage.

Figure 9:
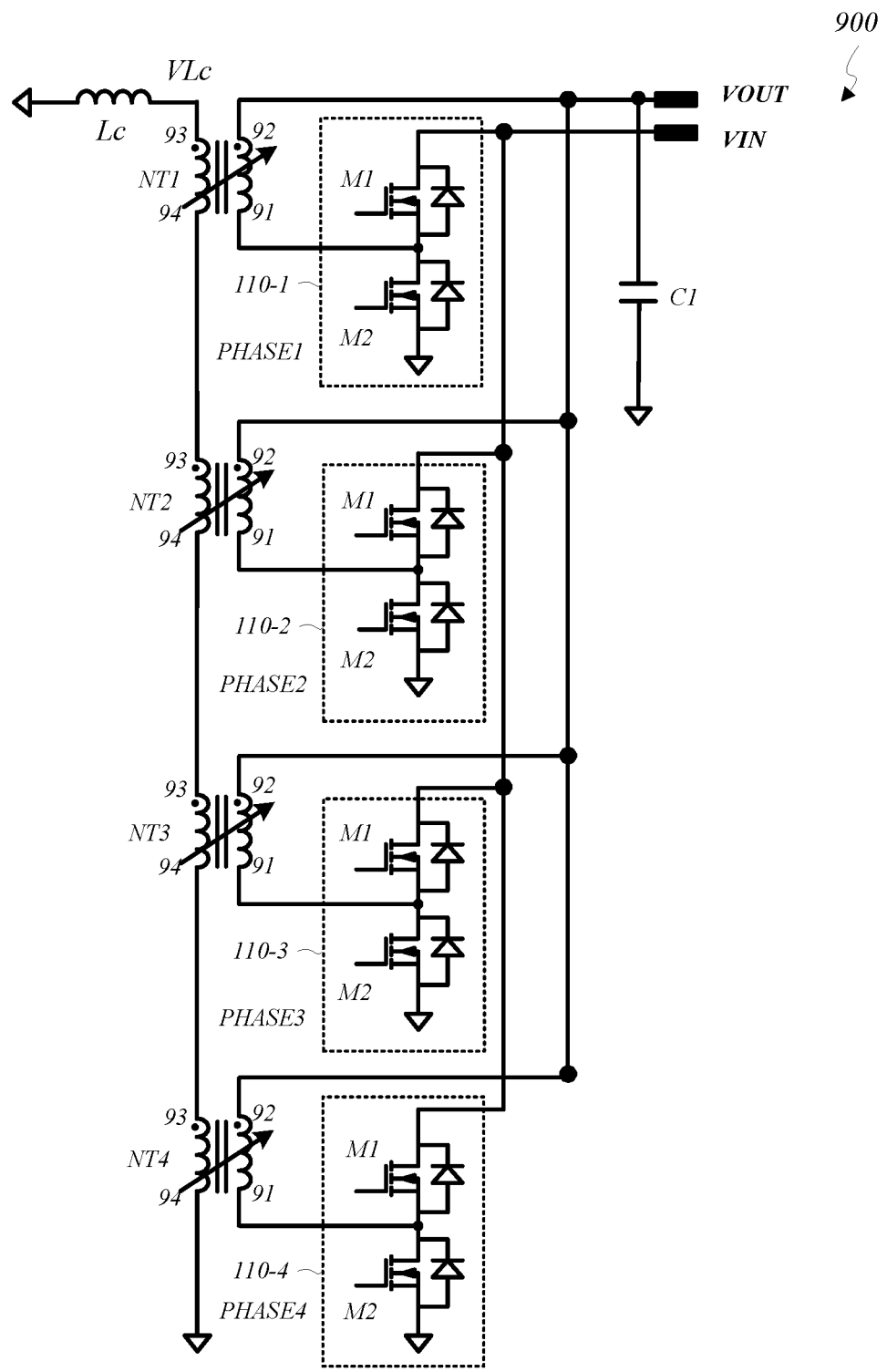
FIG. 9 shows a schematic diagram of a TLVR circuit 900 with nonlinear transformers in accordance with an embodiment of the present invention.

FIG. 9 shows a schematic diagram of a TLVR circuit 900 with nonlinear transformers in accordance with an embodiment of the present invention. In the example of FIG. 9, the TLVR circuit 900 is a multiphase TLVR with four phases. As can be appreciated, the TLVR circuit 900 may also be implemented with fewer or more phases.

In the example of FIG. 9, the TLVR circuit 900 comprises a plurality of regulator blocks 110 and a plurality of nonlinear transformers NT. Each regulator block 110 provides a phase of the TLVR circuit 900, and each nonlinear transformer NT has four terminals 91-94, a primary winding between terminals 91 and 92, and a secondary winding between terminals 93 and 94. The regulator block 110 is connected to the output capacitor C1 by way of the primary winding of a corresponding nonlinear transformer NT, i.e., the regulator block 110 has the corresponding nonlinear transformer NT whose primary winding serves as the output inductor of the regulator block 110. For example, referring to the regulator block 110-1, the nonlinear transformer NT1 has the primary winding with a first end (i.e., terminal 91) that is connected to the switch node of the switches M1 and M2 and a second end (i.e., terminal 92) that is connected to the output voltage VOUT. The secondary winding of the nonlinear transformer NT1 is connected in series with the secondary windings of the nonlinear transformers NT2, NT3, and NT4 of the regulator blocks 110-2, 110-3, and 110-4, respectively. The compensation inductor Lc is connected in series with the secondary windings of the nonlinear transformers NT1, NT2, NT3, and NT4. The series-connected compensation inductor Lc and the secondary windings of nonlinear transformers NT1, NT2, NT3 and NT4 is grounded. For example, the compensation inductor Lc has a first terminal connected to the ground, and a second terminal. The secondary winding of the nonlinear transformer NT1 has a first end (i.e., terminal 93) that is connected to the second terminal of the compensation inductor Lc, and a second end (i.e., terminal 94) that is connected to a first subsequent nonlinear transformer NT2. The secondary winding of the nonlinear transformer NT2 has a first end (i.e., terminal 93) that is connected to a preceding nonlinear transformer NT1 and a second end (i.e., terminal 94) that is connected to the first subsequent nonlinear transformer NT3. The secondary winding of the nonlinear transformer NT3 has a first end (i.e., terminal 93) that is connected to the last preceding nonlinear transformer NT2 and a second end (i.e., terminal 94) that is connected to the first subsequent nonlinear transformer NT4. The secondary winding of the nonlinear transformer NT4 has a first end (i.e., terminal 93) that is connected to the last preceding nonlinear transformer NT3 and a second end (i.e., terminal 94) that is connected to the ground. In one example, each nonlinear transformer may have a primary to secondary turns ratio of 1:1.

In one embodiment, each transformer NT is nonlinear in that neither the primary winding nor the secondary winding have a constant inductance throughout the operating region of the TLVR circuit 900. In one embodiment, the inductance of the primary winding and the inductance of the secondary winding varies depending on the load current. For example, the primary winding of the transformer NT has an inductance that is large when the load current is low, and an inductance that is small when the load current is high. Similarly, the secondary winding of the transformer NT has an inductance that is large when the load current is low, and an inductance that is small when the load current is high. More particularly, the primary winding of the transformer NT has a first inductance when a current flowing through the load is at a first level, and the primary winding of the transformer NT has a second inductance less than the first inductance when the current flowing through the load is at a second level that is higher than the first level. In one embodiment, the inductance of the secondary winding of the transformer NT equals the inductance of the primary winding of the transformer NT. In another embodiment, the inductance of the secondary winding of the transformer NT may be different from the inductance of the primary winding of the transformer NT.

In one embodiment, the compensation inductor Lc in the TLVR circuit 900 is nonlinear. In another embodiment, the compensation inductor in the TLVR circuit 900 is a normal inductor that has a constant inductance throughout the operating region of the TLVR circuit 900.

In the example of FIG. 9, the TLVR circuit 900 is depicted as having a single primary winding and a single secondary winding for illustration purposes. As can be appreciated, embodiments of the present invention are also applicable to TLVR circuits with different numbers of transformer windings.

Figure 10:
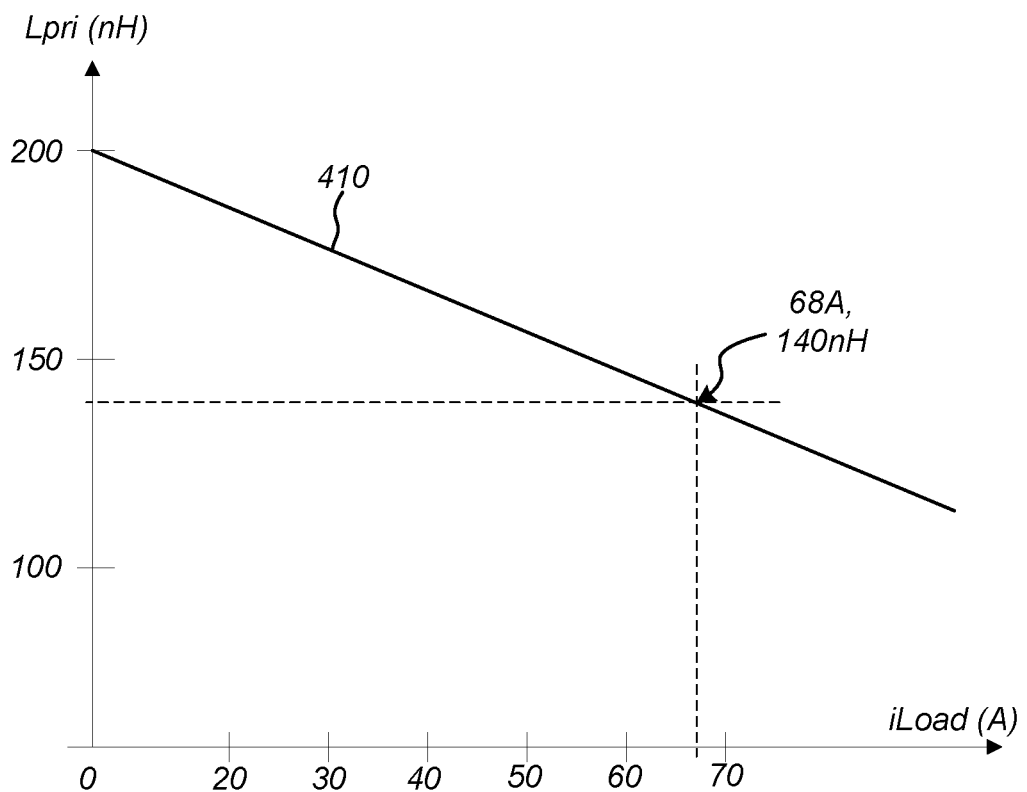
FIGS. 10-13 show inductance profiles of a primary winding of a nonlinear transformer in accordance with embodiments of the present invention.

FIG. 10 shows an inductance profile 410 of the primary winding of the nonlinear transformer NT in accordance with embodiments of the present invention. An inductance profile of a primary winding of a transformer indicates an inductance of the primary winding for a given current flowing through the primary winding when a secondary winding is open. In one embodiment, an inductance profile of the secondary winding of the nonlinear transformer NT is same or similar as the inductance profile 410, and will not be illustrated here for simplicity.

In the example of FIG. 10, the vertical axis indicates inductance Lpri of the primary winding of the nonlinear transformer NT in nano Henry (nH) and the horizontal axis indicates the load current iLoad in Amp (A). In some embodiments, the primary winding of the nonlinear transformer NT has a linear inductance profile as illustrated in FIG. 10. In the example of FIG. 10, "linear" refers to the shape of the inductance profile. As can be appreciated, the nonlinear transformer NT may have a linear inductance profile for the primary winding by having varying inductance depending on the load current iLoad. In the example of FIG. 10, the inductance Lpri is at least 200 nH at 0 A, and the inductance Lpri decreases to at least 140 nH at 68 A.

Figure 11:
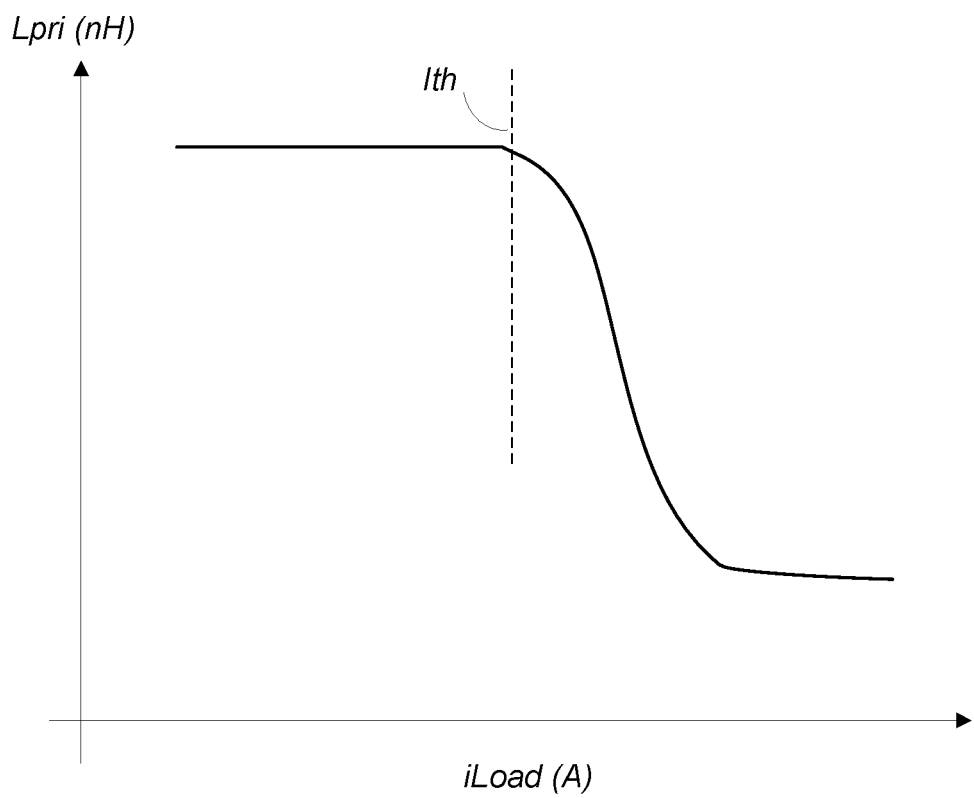
Figure 12:
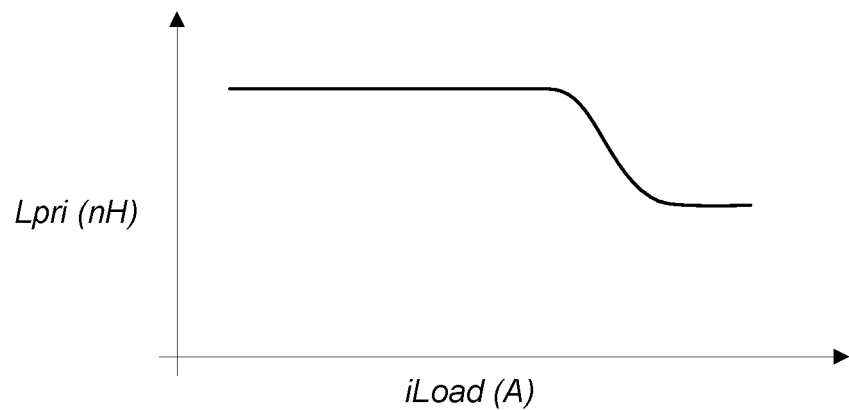
Figure 13:
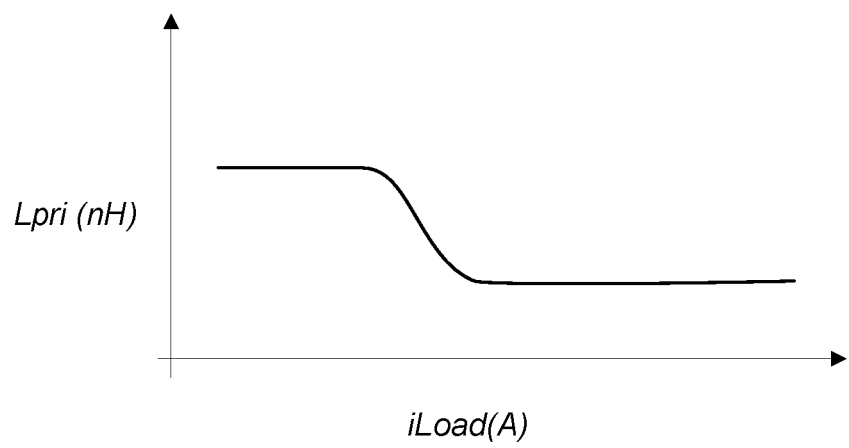

The inductance profile 410 is provided for illustration purposes only. In light of the present disclosure, it can be appreciated that the inductance profile of the primary winding of the nonlinear transformer NT may be configured to meet the needs of a particular TLVR circuit. For example, the inductance Lpri may be configured to be a large inductance up to a current threshold Ith and to decrease sharply after the current threshold Ith as illustrated in FIG. 11 (e.g., at a current threshold of 40 A). In another example, the inductance Lpri may be configured to decrease sharply at a higher load current iLoad as illustrated in FIG. 12 (e.g., at a current threshold of 50 A) or at lower load current iLc (e.g., at a current threshold of 30 A) as illustrated in FIG. 13.

The inductance profile of the primary winding and the secondary winding of the nonlinear transformer NT may be configured by using a suitable magnetic core. For example, instead of using a magnetic core made of ferrites, a magnetic core made of powdered-iron, hybrid material, multiple magnetic core parts of different materials, etc., may be employed to shape the inductance profile of the primary winding and the secondary winding of the nonlinear transformer NT.

Figure 14:
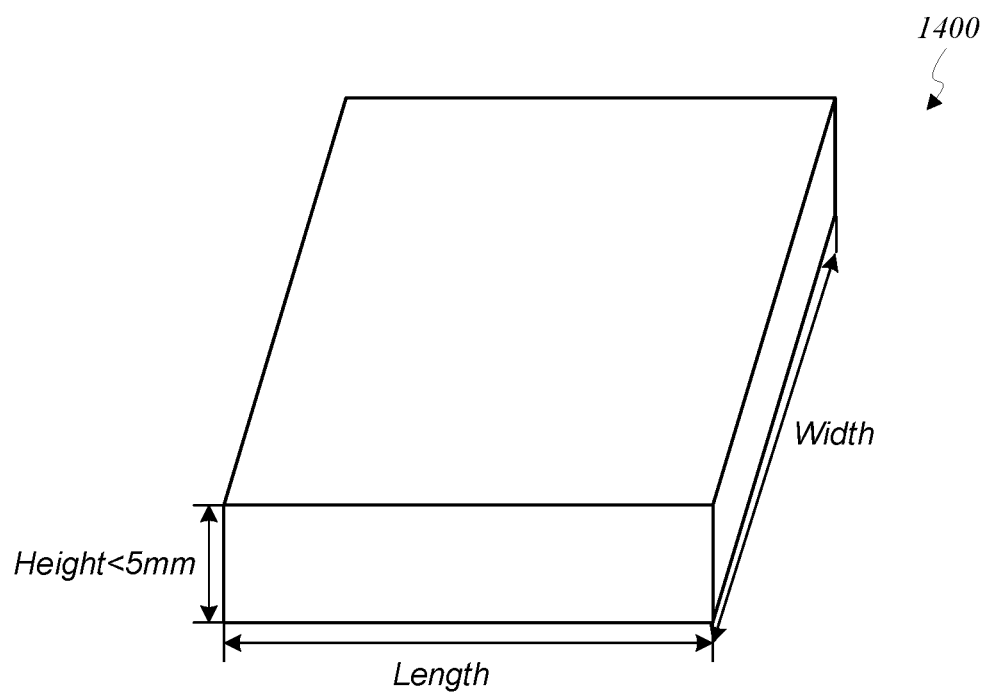
FIG. 14 shows a three-dimensional view 1400 of the nonlinear transformer in accordance with an embodiment of the present invention.

FIG. 14 illustrates a three-dimensional view 1400 of the nonlinear transformer NT in accordance with an embodiment of the present invention. The nonlinear transformer NT may be contained in a package as shown in FIG. 14. In one example, the nonlinear transformer NT has a profile with a height less than 5 mm with the inductance of the primary winding that is at least 200 nH. In one example, the nonlinear transformer NT has a profile with the height less than 5 mm, a sum of a width and a length less than 20 mm, with the inductance of the primary winding that is at least 200 nH. In one example, the nonlinear transformer NT has a profile with the height less than 5 mm, with the inductance of the primary winding that is at least 200 nH for currents of 0 A, and with the inductance of the primary winding, that is at least 140 nH for currents of 68 A.

Figure 15:
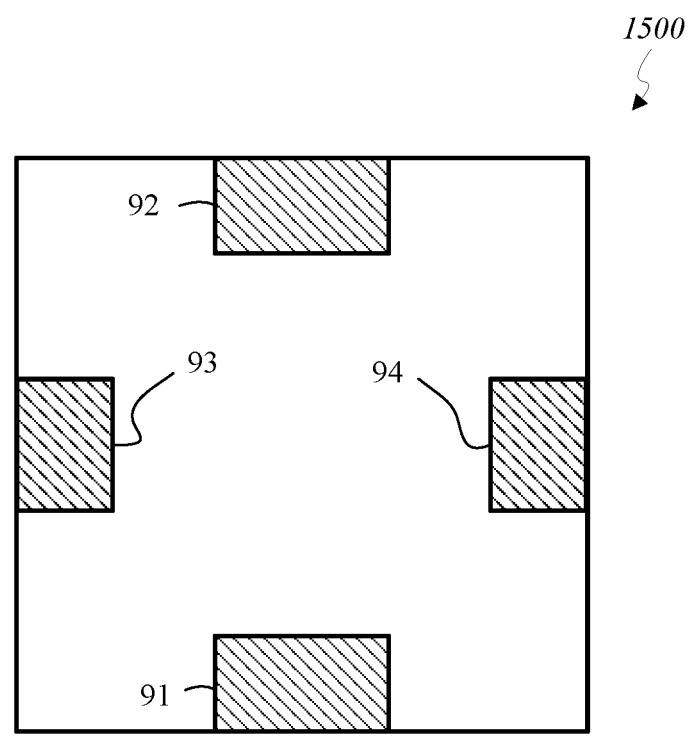
FIG. 15 illustrates a bottom view 1500 of the nonlinear transformer in accordance with an embodiment of the present invention.

FIG. 15 illustrates a bottom view 1500 of the nonlinear transformer NT in accordance with an embodiment of the present invention. In the example of FIG. 15, the terminals 91 and 92 are located at an opposite position with each other, and the terminals 93 and 94 are located at other sides having the opposite position with each other.

Examples shown in FIGS. 14 and 15 will not limit the package of the nonlinear transformer NT, one with ordinary skill in the art should understand that packages with other size and arrangement also might be used without detracting spirits of the present invention.

Figure 16:
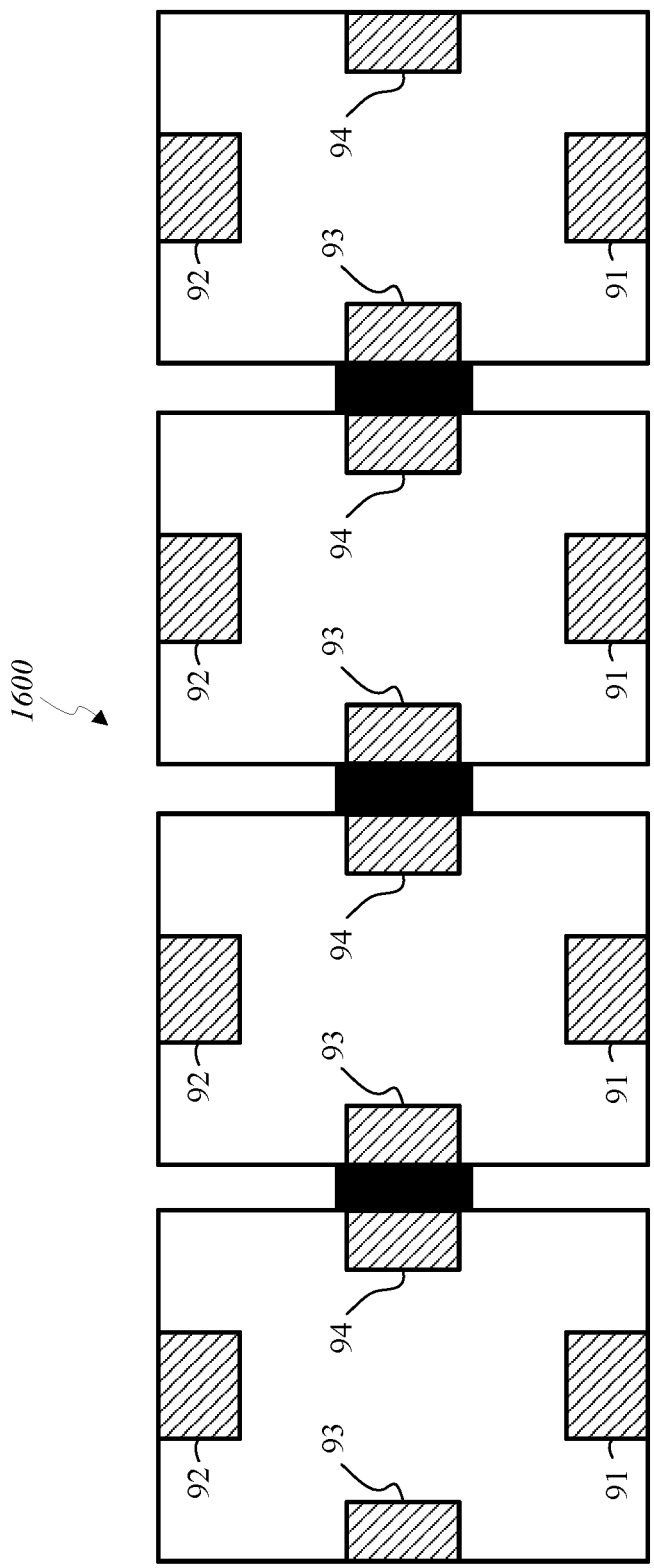
FIG. 16 illustrates a layout 1600 of the nonlinear transformers in accordance with an embodiment of the present invention.

FIG. 16 illustrates a layout 1600 of the plurality of nonlinear transformers in accordance with an embodiment of the present invention. The layout 1600 shows that the terminal 93 of one of the nonlinear transformers is connected to the terminal 94 of other nonlinear transformer. Area of a printed circuit board will be reduced with the layout 1600.

Figure 17:
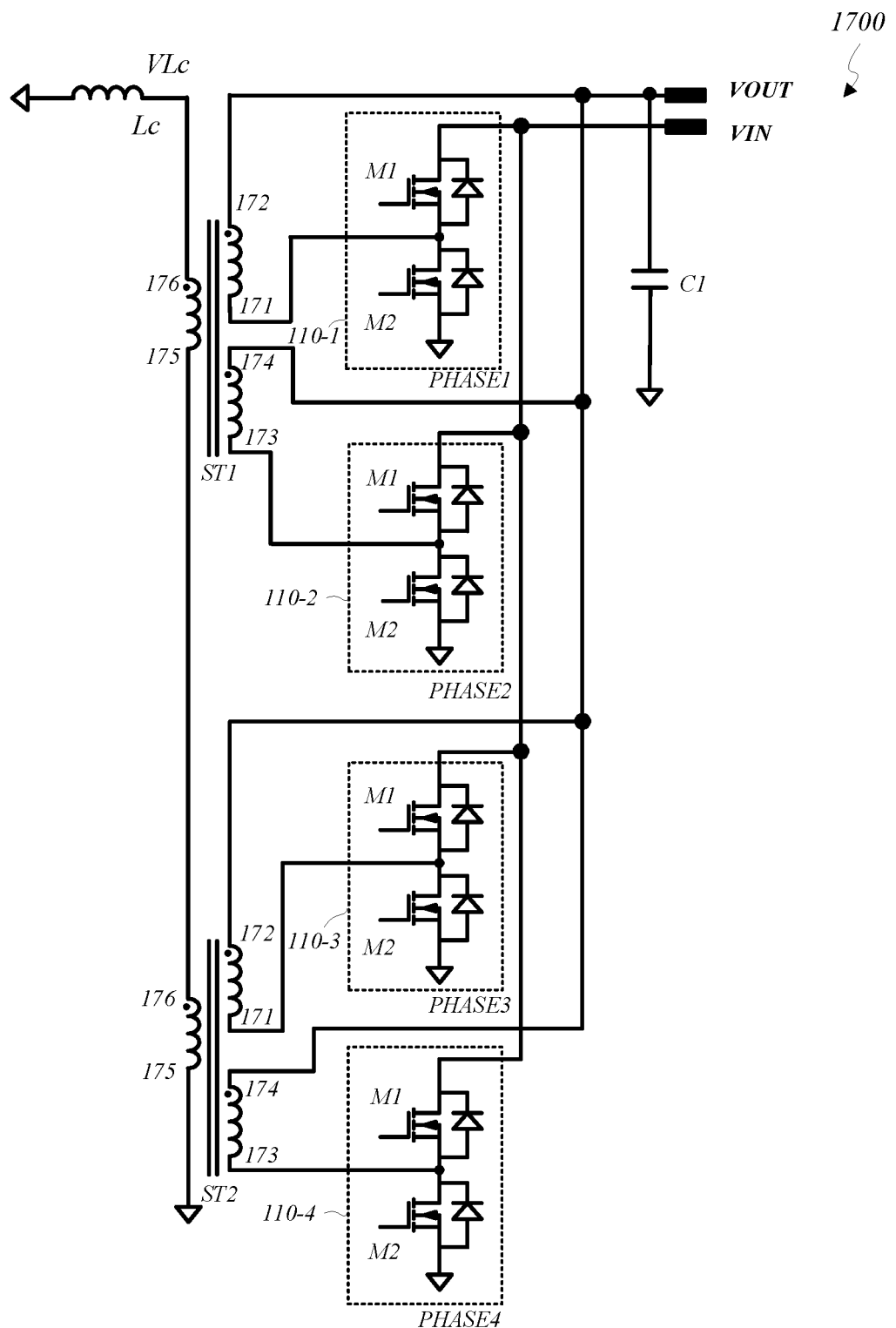
FIG. 17 shows a schematic diagram of a TLVR circuit 1700 with nonlinear transformers in accordance with an embodiment of the present invention.

FIG. 17 shows a schematic diagram of a TLVR circuit 1700 with nonlinear transformers in accordance with an embodiment of the present invention. In the example of FIG. 17, the TLVR circuit 1700 is a multiphase TLVR with four phases. As can be appreciated, the TLVR circuit 1700 may also be implemented with fewer or more phases.

In the example of FIG. 17, the TLVR circuit 1700 comprises a plurality of regulator blocks 110 and a plurality of nonlinear transformers ST. Each regulator block 110 provides a phase of the TLVR circuit 1700, and each nonlinear transformer ST has six terminals 171-176, comprising a first primary winding between terminals 171 and 172, a second primary winding between terminals 173 and 174, and a secondary winding between terminals 175 and 176. Two of the regulator block 110 are connected to the output capacitor C1 respectively by way of one of the primary windings of a corresponding nonlinear transformer ST. For example, the switch node of the regulator block 110-1 is connected to the output voltage VOUT by way of the primary winding between the terminals 171 and 172 of the nonlinear transformer ST1, the switch node of the regulator block 110-2 is connected to the output voltage VOUT by way of the primary winding between the terminals 173 and 174 of the nonlinear transformer ST1, the switch node of the regulator block 110-3 is connected to the output voltage VOUT by way of the primary winding between the terminals 171 and 172 of the nonlinear transformer ST2, and the switch node of the regulator block 110-4 is connected to the output voltage VOUT by way of the primary winding between terminals 173 and 174 of the nonlinear transformer ST2. The secondary winding between the terminals 175 and 156 of the nonlinear transformer ST1 is connected in series with the secondary winding between the terminals 175 and 176 of the nonlinear transformer ST2. The compensation inductor Lc is connected in series with the secondary windings of the nonlinear transformers ST1 and ST2. The series-connected compensation inductor Lc and the secondary windings of the nonlinear transformers ST1 and ST2 is grounded. In one example, the turns ratio of the primary winding between terminals 171 and 172, the primary winding between terminals 173 and 174, and the secondary winding between terminals 175 and 176 of each nonlinear transformer ST may be 1:1:2, such that the inductance of the secondary winding equals double of the inductance of the primary winding.

A TLVR circuit with nonlinear compensation inductor and/or nonlinear transformer has been disclosed. While specific embodiments of the present invention have been provided, it is to be understood that these embodiments are for illustration purposes and not limiting. Many additional embodiments will be apparent to persons of ordinary skill in the art reading this disclosure.

What we claim is:

1. A trans-inductor voltage regulator (TLVR) circuit, comprising:
   a plurality of nonlinear transformers, each of the plurality of nonlinear transformers comprising a first winding and a second winding, the second windings of the plurality of nonlinear transformers being connected in series to each other;
   a plurality of regulator blocks that each provides a phase of the TLVR circuit, each of the plurality of regulator blocks being connected to an output capacitor of the TLVR circuit by way of the first winding of a corresponding one of the plurality of nonlinear transformers, the first winding of the corresponding one of the plurality of nonlinear transformers having a first inductance when a load current provided by the TLVR circuit to a load is at a first level, and the first winding of the corresponding one of the plurality of nonlinear transformers having a second inductance that is less than the first inductance when the load current is at a second level that is higher than the first level; and
   a compensation inductor that is connected in series with the second windings of the plurality of nonlinear transformers; wherein
   each of the plurality of nonlinear transformers has a profile with a height less than 5 mm with an inductance of the first winding that is at least 200 nH.

2. The TLVR circuit of claim 1, wherein each of the plurality of nonlinear transformers has a magnetic core that is made of powdered-iron.

3. The TLVR circuit of claim 1, wherein each of the plurality of nonlinear transformers has an inductance profile with an inductance of the first winding that is at least 200 nH for currents of 0 A and at least 140 nH for currents of 68 A.

4. The TLVR circuit of claim 1, wherein each of the plurality of nonlinear transformers has a profile with a height less than 5 mm, with an inductance of the first winding that is at least 200 nH for currents of 0 A, and with an inductance of the first winding that is at least 140 nH for currents of 68 A.

5. The TLVR circuit of claim 1, wherein each of the plurality of nonlinear transformers comprises:
   a first terminal, connected to a corresponding one of the plurality of regulator blocks;
   a second terminal, connected to the output capacitor of the TLVR circuit;
   a third terminal, connected to the compensation inductor or a fourth terminal of a last preceding one of the plurality of nonlinear transformers; and
   the fourth terminal, connected to a ground or the third terminal of a first subsequent one of the plurality of nonlinear transformers.

6. The TLVR circuit of claim 5, wherein each of the plurality of nonlinear transformers is contained in a package, such that the first terminal and the second terminal are located at an opposite position with each other, and the third terminal and the fourth terminal are located at other sides having the opposite position with each other.

7. The TLVR circuit of claim 5, wherein the third terminal of a first one of the plurality of nonlinear transformers is connected to the fourth terminal of a second one of the plurality of nonlinear transformers, and the third terminal of the second one of the plurality of nonlinear transformers is connected to the fourth terminal of a third one of the plurality of nonlinear transformers.

8. The TLVR circuit of claim 1, wherein each of the regulator blocks comprises:
   a high-side switch and a low-side switch, a switch node between the high-side switch and the low-side switch being connected to a first end of the first winding of the corresponding one of the plurality of nonlinear transformers, and a second end of the first winding of the corresponding one of the plurality of nonlinear transformers being connected to the output capacitor.

9. The TLVR circuit of claim 8, wherein the high-side switch is connected to an input voltage.

10. The TLVR circuit of claim 1, wherein:
   a series-connection of the second windings of the plurality of nonlinear transformers has a first end that is connected to ground and a second end that is connected to a first end of the compensation inductor; and wherein
   a second end of the compensation inductor is connected to ground.

11. The TLVR circuit of claim 1, wherein:
   the compensation inductor is a nonlinear inductor, such that the compensation inductor having a third inductance when a compensation inductor current flowing through the compensation inductor is responsive to a steady state condition of the load current, and having a fourth inductance when the compensation inductor current is responsive to a transient condition of the load current, the third inductance is larger than the fourth inductance.

12. A trans-inductor voltage regulator (TLVR) circuit, comprising:
  a first regulator block of a first phase of the TLVR circuit, the first regulator block comprising a high-side switch that is connected to an input voltage, a low-side switch that forms a switch node with the high-side switch of the first regulator block, wherein the switch node of the first regulator block is connected to an output voltage of the TLVR circuit by way of a first winding of a first nonlinear transformer, the first winding of the first nonlinear transformer having a first inductance when a load current provided by the TLVR circuit to a load is at a first level, and the first winding of the first nonlinear transformer having a second inductance that is less than the first inductance when the load current is at a second level that is higher than the first level;
  a second regulator block of a second phase of the TLVR circuit, the second regulator block comprising a high-side switch that is connected to the input voltage, a low-side switch that forms a switch node with the high-side switch of the second regulator block, wherein the switch node of the second regulator block is connected to the output voltage of the TLVR circuit by way of a first winding of a second nonlinear transformer, the first winding of the second nonlinear transformer having a third inductance when the load current is at the first level, and the first winding of the second nonlinear transformer having a fourth inductance that is less than the third inductance when the load current is at the second level; and
  a compensation inductor that is connected in series with a second winding of the first nonlinear transformer and a second winding of the second nonlinear transformer.

13. The TLVR circuit of claim 12, wherein at least one of the first nonlinear transformer and the second nonlinear transformer has a magnetic core that is made of powdered-iron.

14. The TLVR circuit of claim 12, further comprising:
  a third regulator block of a third phase of the TLVR circuit, the third regulator block comprising a high-side switch that is connected to the input voltage, a low-side switch that forms a switch node with the high-side switch of the third regulator block, wherein the switch node of the third regulator block is connected to the output voltage of the TLVR circuit by way of a first winding of a third nonlinear transformer, the first winding of the third nonlinear transformer having a fifth inductance when the load is at the first level, and the first winding of the third nonlinear transformer having a sixth inductance that is less than the fifth inductance when the load current is at the second level; and
  a fourth regulator block of a fourth phase of the TLVR circuit, the fourth regulator block comprising a high-side switch that is connected to the input voltage, a low-side switch that forms a switch node with the high-side switch of the fourth regulator block, wherein the switch node of the second regulator block is connected to the output voltage of the TLVR circuit by way of a first winding of a fourth nonlinear transformer, the first winding of the fourth nonlinear transformer having a seventh inductance when the load current is at the first level, and the first winding of the fourth nonlinear transformer having a eighth inductance that is less than the seventh inductance when the load current is at the second level; wherein
  the compensation inductor is connected in series with the second winding of the first nonlinear transformer, the second winding of the second nonlinear transformer, a second winding of the third nonlinear transformer, and a second winding of the fourth nonlinear transformer.

15. The TLVR circuit of claim 14, wherein each of the nonlinear transformers comprises:
  a first terminal, connected to the switch node of a corresponding one of the regulator blocks;
  a second terminal, connected to the output voltage of the TLVR circuit;
  a third terminal, connected to the compensation inductor or the second winding of a last preceding nonlinear transformer;
  a fourth terminal, connected to the ground or the second winding of a first subsequent nonlinear transformer; and wherein
  each of the nonlinear transformers is contained in a package, such that the first terminal and the second terminal are located at an opposite position with each other, and the third terminal and the fourth terminal are located at other sides having the opposite position with each other.

16. The TLVR circuit of claim 12, wherein each of the first nonlinear transformer and the second nonlinear transformer has a profile with a height less than 5 mm, with an inductance of the first winding that is at least 200 nH for currents of 0 A, and with an inductance of the first winding that is at least 140 nH for currents of 68 A.

17. The TLVR circuit of claim 12, wherein each of the first nonlinear transformer and the second nonlinear transformer has a profile with a height less than 5 mm with an inductance of the first winding that is at least 200 nH.

18. A trans-inductor voltage regulator (TLVR) circuit, comprising:
  a first regulator block of a first phase of the TLVR circuit, the first regulator block comprising a high-side switch that is connected to an input voltage, a low-side switch that forms a switch node with the high-side switch of the first regulator block, wherein the switch node of the first regulator block is connected to an output voltage of the TLVR circuit by way of a first primary winding of a nonlinear transformer, the first primary winding having a first inductance when a load current provided by the TLVR circuit to a load is at a first level, and the first primary winding having a second inductance that is less than the first inductance when the load current is at a second level that is higher than the first level;
  a second regulator block of a second phase of the TLVR circuit, the second regulator block comprising a high-side switch that is connected to the input voltage, a low-side switch that forms a switch node with the high-side switch of the second regulator block, wherein the switch node of the second regulator block is connected to the output voltage of the TLVR circuit by way of a second primary winding of the nonlinear transformer, the second primary winding having a third inductance when the load current is at the first level, and the second primary winding having a fourth inductance that is less than the third inductance when the load current is at the second level; and
  a compensation inductor that is connected in series with a secondary winding of the nonlinear transformer.

19. The TLVR circuit of claim 18, wherein the nonlinear transformer has a magnetic core that is made of powdered-iron.

20. A trans-inductor voltage regulator (TLVR) circuit, comprising:
 a plurality of nonlinear transformers, each of the plurality of nonlinear transformers comprising a first winding and a second winding, the second windings of the plurality of nonlinear transformers being connected in series to each other;
 a plurality of regulator blocks that each provides a phase of the TLVR circuit, each of the plurality of regulator blocks being connected to an output capacitor of the TLVR circuit by way of the first winding of a corresponding one of the plurality of nonlinear transformers, the first winding of the corresponding one of the plurality of nonlinear transformers having a first inductance when a load current provided by the TLVR circuit to a load is at a first level, and the first winding of the corresponding one of the plurality of nonlinear transformers having a second inductance that is less than the first inductance when the load current is at a second level that is higher than the first level; and
 a compensation inductor that is connected in series with the second windings of the plurality of nonlinear transformers; wherein
each of the plurality of nonlinear transformers comprises:
 a first terminal, connected to a corresponding one of the plurality of regulator blocks;
 a second terminal, connected to the output capacitor of the TLVR circuit;
 a third terminal, connected to the compensation inductor or a fourth terminal of a last preceding one of the plurality of nonlinear transformers; and
 the fourth terminal, connected to a ground or the third terminal of a first subsequent one of the plurality of nonlinear transformers; and wherein
each of the plurality of nonlinear transformers is contained in a package, such that the first terminal and the second terminal are located at an opposite position with each other, and the third terminal and the fourth terminal are located at other sides having the opposite position with each other.

\* \* \* \* \*